United States Patent [19]

Wakim

[11] 4,372,052
[45] Feb. 8, 1983

[54] DEVICE FOR INDICATING DIRECTION TO A PREDETERMINED LOCALE

[76] Inventor: Edmond K. Wakim, P.O. Box 8, Hazmieh, Lebanon

[21] Appl. No.: 204,868

[22] Filed: Nov. 7, 1980

[51] Int. Cl.³ .................... G01C 9/00; G01C 17/14
[52] U.S. Cl. .................................. 33/349; 33/1 CC; 33/355 R; 116/DIG. 43
[58] Field of Search ............... 33/349, 355, 1 B, 1 H, 33/1 CC; 116/DIG. 43

[56] References Cited

FOREIGN PATENT DOCUMENTS

| 1054674 | 2/1954 | France | 33/255 |
| 64028 | 10/1955 | France | 33/255 |
| 328782 | 3/1958 | Switzerland | 33/255 |

Primary Examiner—Steven L. Stephan
Attorney, Agent, or Firm—Edmund M. Jaskiewicz

[57] ABSTRACT

A direction indicating device has an azimuth card which is positioned upon a compass. The card is provided with a number of indicia marks corresponding to specific geographic locations. An adjustable straight-line cursor is positioned to be aligned with an indicia marking corresponding to the geographic location at which the device is being used and with the pivot point of the compass magnetic needle such that when the compass magnetic needle is pointing to magnetic North, the straight-line cursor will indicate the true direction of the predetermined locale from that specific geographic location.

5 Claims, 4 Drawing Figures

DEVICE FOR INDICATING DIRECTION TO A PREDETERMINED LOCALE

The present invention relates to a direction indicating device, more particularly, to a device and process for indicating the direction of a predetermined locale from a specific geographic location utilizing a compass.

Many forms of devices have been employed to ascertain particular directions from points on land or sea. The ascertained directions are then indicative of the direction in which one must march or otherwise proceed to reach a designated location or for navigation purposes if on water. One category of such direction finding devices depends upon the magnetic field of the earth. The common compass is widely used to ascertain direction since the compass will always indicate magnetic North and true North can then be readily calculated from available charts of magnetic variation for different points on the earth. The compass is usually used in conjunction with a map to determine the direction to a particular location.

Known direction-indicating devices are not directed to the problem of ascertaining the true direction of a particular locale from any point on the face of the earth. The ascertaining of the direction to a particular locale is especially important to Moslems who are commanded several times a day to face toward Mecca for prayer. In the Arab countries of the Mideast there is no problem in finding the right direction toward Mecca. However, when a Moslem is traveling or is located in a country half-way around the world from Saudi-Arabia, the problem of determining the true direction toward Mecca is much more complicated. At the preset time, the only device which is readily available around the world is the compass. However, the use of an ordinary compass is complicated and requires a tedious and difficult procedure.

It is therefore the principal object of the present invention to provide a novel and improved device and process for indicating the direction of a predetermined locale from a specific geographic location.

It is another object of the present invention to provide a device which will enable a person located anywhere in the world to ascertain the true direction of a particular location.

It is a further object of the present invention to provide a device which will enable a Moslem to locate the true direction of Mecca from any point in the world.

According to one aspect of the present invention, a device for indicating the direction of a predetermined locale from a specific geographic location may comprise a compass having a pivotally mounted magnetic needle and an azimuth card positionable upon the compass in a predetermined relationship with respect to the compass needle. The azimuth card has indicia markings thereon with each mark corresponding to a specific geographic location with respect to a North-South reference which may be on the azimuth card. An adjustable straight-line cursor is positionable to be aligned with the pivot of the compass needle and an indicia mark on the azimuth card corresponding to the geographic location at which the device is being used. The cursor will then point in the direction of the predetermined locale from that specific geographic location when the compass needle is aligned with the North-South reference.

A process for ascertaining the direction of a predetermined locale from a specific geographic location may comprise the steps of placing marks on an azimuth card indicative of specific geographic locations such that a line between a mark representing the location at which the device is used and a center point on the card corresponds to the azimuth of the predetermined locale from that geographic location. The card is then placed upon a compass so that the center point on the card coincides with the pivot point of the compass needle. The card is oriented with magnetic North as determined by the magnetic needle. A mark on the card corresponding to the geographic location from which the direction to the locale is sought and the center point of the card are aligned to indicate the direction to the locale.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
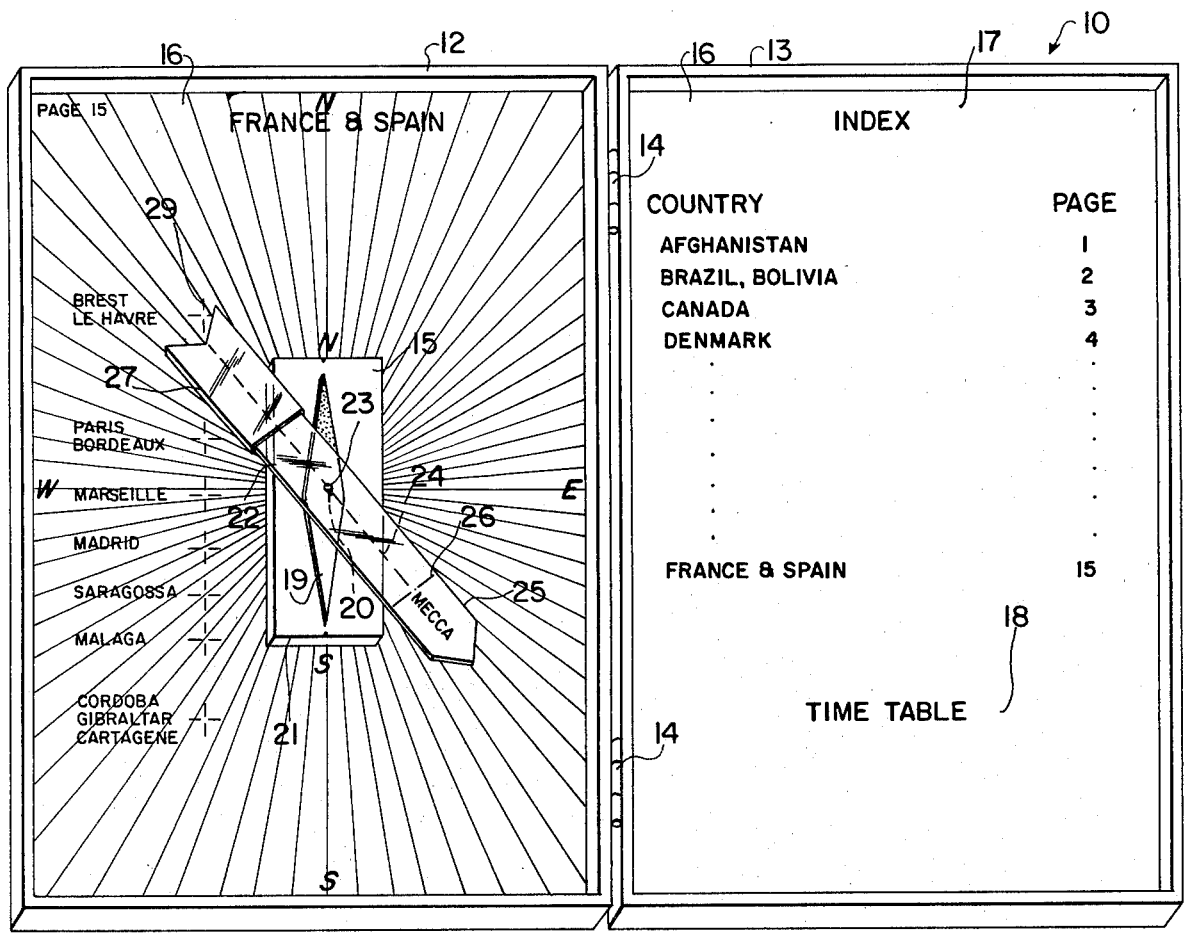
FIG. 1 is an overall perspective view as seen from the top of the device according to the present invention in its open or operating position.
Figures 2, 3:
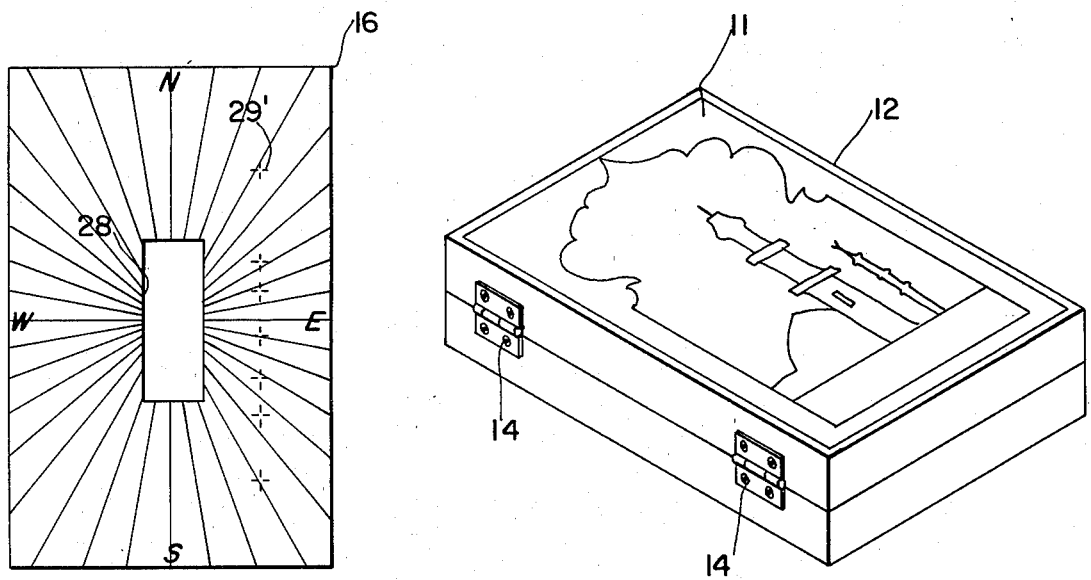
FIG. 2 is a top plan view of a single azimuth card according to the present invention.
FIG. 3 is an overall perspective view as seen from the top of the device of FIG. 1 in the closed position.

The device of the present invention indicated generally at 10 is enclosed in a rectangular box or casing 11 which consists of two halves 12 and 13 pivotally connected together with hinges 14 so as to be able to be opened like a book into the position as shown in FIG. 1. A compass 15 is affixed in the center of casing half 12 and casing half 13 contains a number of azimuth cards or charts 16 one of which is shown in FIG. 2. Casing half 13 also contains an index 17 which is preferably positioned on the top of the pile of cards 16 and the index is further provided with a time table 18 which may be a normal time table showing local time in every place of the world. In its closed position, as shown in FIG. 3, the box 11 is about 15 cm long, 10 cm wide and 3 cm in height or depth or of the shape and size of a small book. The casing is made of non-magnetic materials such as wood or suitable plastics, pressed paper or cardboard and may be provided with a suitable latch or clasp to maintain the casing halves closed.

The compass 15 is rectangular in shape and has a magnetic needle 19 pivotally mounted on a pivot 20. The compass needle 19 is of a limited pivoting range which may be about 2 cm so that the needle can pivot 1 cm to each side of the North and South references. The compass is further provided with a locking system 21 by means of which the compass needle can be locked in position when not in use.

A straight-line cursor or direction indicator 22 is pivotally supported at its pivot point 23 to the pivot 20 of the compass needle so that the cursor is capable of being adjustably positioned throughout 360°. The cursor 22 is made of a transparent plastic material and may be inscribed or otherwise marked with a line 24. The cursor is provided with a head 25 upon which may be noted the name of the locale whose direction is being sought. The head end is foldable upwardly along the line 26. The other end of the cursor 22 is provided with a sliding tail end 27 which may slide upon the body of the cursor and is provided with an extension of the line 24. By sliding the tail end 27 toward the center of the cursor and by folding up the head end 25 the overall length of the cursor is shortened so that the opening in the azimuth card will fit over the cursor in a manner to be presently described.

Each azimuth card or chart 16 has a central opening 28 which is rectangular in shape so as to closely fit over the compass 15. By fitting closely over the compass the card 16 is thus oriented with respect to the compass. The azimuth cards are preferably made of a heavy paper, cardboard or plastic and are shaped to conform to the interior dimension of the casing halves 12 and 13 so as to fit snugly within these casing halves with a minimum of play.

Each azimuth card 16 corresponds to a particular geographic region on the earth such as a single country or adjacent countries as shown on the card "page 15" in FIG. 1. This card has a number of indicia marks 29 each of which represents a particular geographic location which, in this particular example, is a city or closely adjacent cities. These marks 29 are so positioned on the respective azimuth card 16 that a straight line between the mark representing the geographic location at which the device is being used, such as at Le Havre in the example of FIG. 1, and passing through the center of the opening 28 which corresponds to the pivot of the compass needle will point in the direction of a predetermined locale which, in this particular example, is Mecca. This line drawn between an indicia mark 29 and the center of the card opening is the true direction of the locale since the azimuth represented by this line has been previously calculated to compensate for magnetic variation at that geographic location. Thus, when the open casing is oriented so that the magnetic needle 20 points to magnetic North, a line drawn between the mark 29 and the center of the card opening will indicate the true direction of Mecca. Since the magnetic variation changes periodically, these azimuth cards are preferably updated on a regular basis, such as every four years, (according to the latest chart of the "Earth Magnetic Field" published by the Defense Mapping Agency Hydrographic Center) so that the true direction of the predetermined locale will always be indicated.

Figure 4:
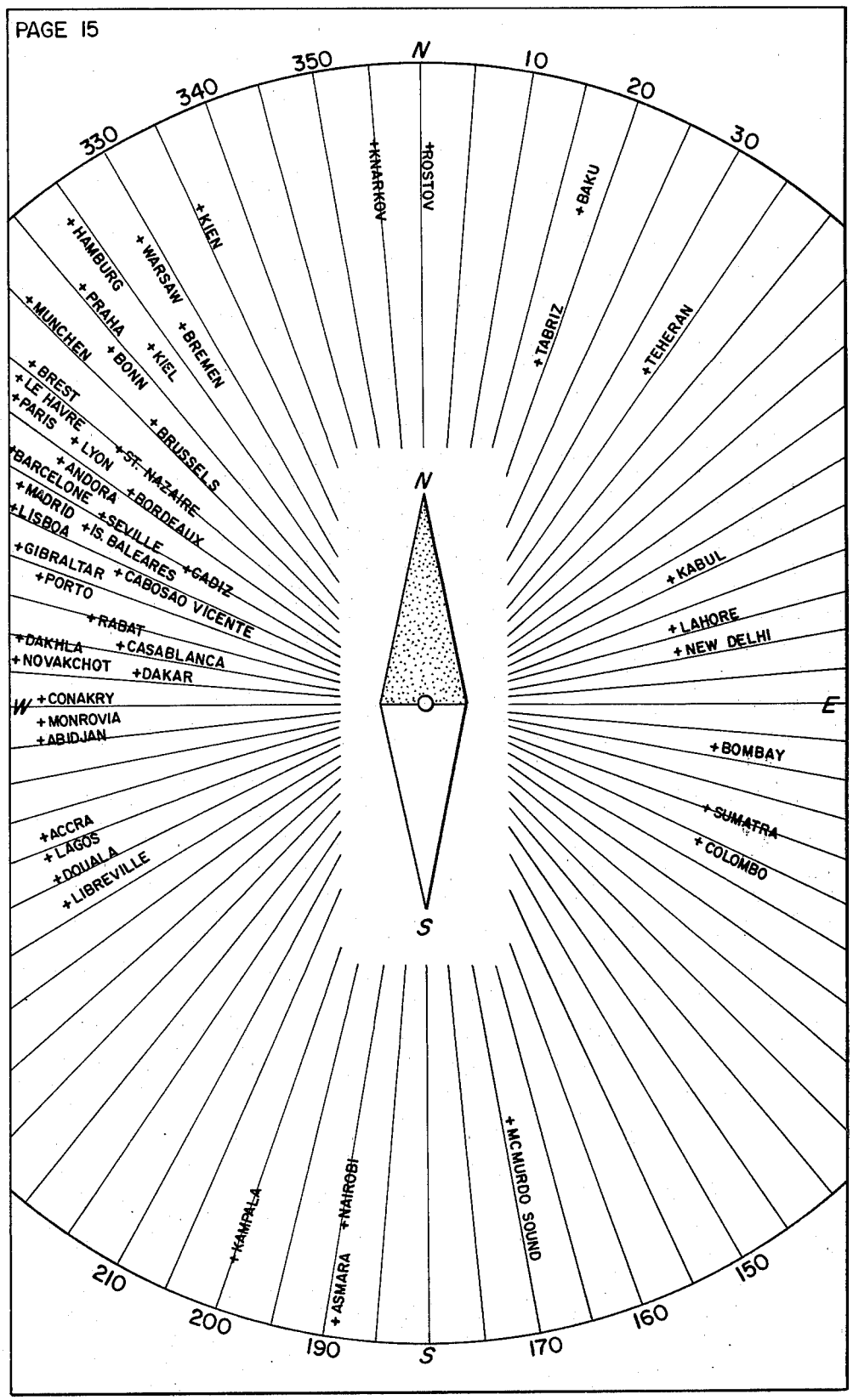
FIG. 4 is a plan view of a chart used in the preparation of an azimuth card.

To facilitate preparation of the indicia marking, the cards are each divided into 360 degrees as shown at 30 in FIG. 4. The zero corresponds to the North, the 90° to the East, the 180° to the South and the 270° to the West.

Thus, while it is not possible with merely the compass to ascertain geographic North, the ascertaining of magnetic North with the compass together with the azimuth cards which have been calculated to compensate for magnetic variation, will indicate the true direction of the locale.

For those countries or geographic regions located to the East of Mecca the indicator marks 29' will be along the right side of the card such as shown in FIG. 2.

A separate card is prepared for each country or location as indicated in the index 17 of FIG. 1. Each card is further provided with a page number so that it can be quickly located. The cards are referred to as "pages" since the cards are all attached together along a long edge similar to the pages of a book. The attachment may be expansible or flexible, such as an accordion pleat, so that a card or cards may be lifted from the pile in casing half 13 and turned over onto compass 15 so that the desired card is visible in casing half 12. With this construction, the cards at all times are in their correct order with respect to their page numbers.

As a modification, each card can be separate and unconnected with the other cards so that an individual card may be removed from the stack of cards in casing half 13 and positioned in casing half 12 over the compass 15 in the manner as presently described.

After a suitable number of azimuth cards have been prepared, a user of the device then selects a card corresponding to the geographic region in which the user is located and from which the user desires to ascertain the true direction of a particular locale, such as Mecca.

This card is then positioned over the compass 15 in casing half 12 after folding up head end 25 of the cursor 22 and sliding in tail end 27 of the cursor so that the shortened cursor will fit through the card opening 28. When the card has been positioned over the compass in the casing half either by being turned over as a page in a book or lifted from a pile of cards, it is then properly oriented with respect to the compass.

The device in its open position as shown in FIG. 1 is then carefully moved until the compass needle 19 is aligned with true magnetic North. The cursor is then moved so that the line 24 on the cursor which may lie on the slidable tail end 27 is then aligned with the indicator mark corresponding to the specific geographic location or city in which the user is located. Since the cursor is pivotally mounted on a point coinciding with the pivot of the compass needle, the head of the cursor 24 will now point in the true direction of Mecca.

The center of the opening 28 coincides with the pivot of the compass needle 19 when the azimuth card is positioned in the casing half 12 as shown in FIG. 1.

North-South reference marks may also be placed on each azimuth card adjacent the narrow ends of opening 28 to ensure that a card is properly oriented with respect to the compass. The top of each card bearing the page number and title is positioned at the top of the casing half or the North end of the compass.

Thus it can be seen that the present invention provides a simple and effective device and process to ascertain the true direction of a specific locale, such as Mecca, from a specific geographic point anywhere in the world. The present invention thus facilitates the problems of Moslems in ascertaining the true direction of Mecca from any place in the world. The device is small and compact and can be carried as a small book and is simple in operation so that one can quickly ascertain the true direction of a predetermined locale from his present geographic location.

It will be understood that this invention is susceptible to modification in order to adapt it to different usages and conditions and, accordingly, it is desired to comprehend such modifications within this invention as may fall within the scope of the appended claims.

What is claimed is:

1. In a device for indicating the direction of a predetermined locale from a specific geographic location at any point in the world, a compass having a magnetic needle pivotally mounted on a pivot, a plurality of azimuth cards and each card representing a particular geographic region, there being a plurality of indicia markings on each card corresponding to specific geographic locations in said region, said azimuth cards each having an opening therein to accommodate the magnetic needle when a said card is positioned on the compass such that each card is selectively positionable upon said compass in a predetermined relationship to said magnetic needle corresponding to the specific geographic location at which the device is being used with respect to a North-South reference, means for orienting a said azimuth card on said compass with respect to said magnetic needle, a transparent adjustable straight-line cursor pivotally mounted upon a pivot coinciding with the pivot of the compass magnetic needle and having a straight line thereon to be aligned with said magnetic needle pivot and with a said indicia marking on a said azimuth card which is positioned upon the compass whereby the cursor will indicate the direction of the predetermined locale from said specific geographic location when said compass magnetic needle is aligned with the North-South reference, said cursor having a head end which points to the predetermined locale and a tail end which is aligned with an indicia marking on the card, one of said head end and tail end being foldable and the other of said head end and tail end being slidable to decrease the length of the cursor when positioning a card upon the compass.

2. In a device as in claim 1 wherein the North-South reference on said card is disposed adjacent said opening.

3. In a device as claimed in claim 1 and further comprising a casing having two parts, said compass being fixed in the center of one part and means in the other of said parts for retaining a plurality of azimuth cards therein.

4. In a device as claimed in claim 3 wherein said casing is rectangular, said azimuth cards being shaped to conform to said casing rectangular shape so that a card is oriented with respect to said compass needle when said card is positioned in said one part of the casing.

5. In a device as claimed in claim 4 wherein said casing parts are hinged together so as to be openable to a flat position and closed to enclose said compass and cards.

* * * * *